United States Patent
Takahashi et al.

(10) Patent No.: US 8,443,201 B2
(45) Date of Patent: May 14, 2013

(54) BIOMETRIC AUTHENTICATION SYSTEM, ENROLLMENT TERMINAL, AUTHENTICATION TERMINAL AND AUTHENTICATION SERVER

(75) Inventors: Kenta Takahashi, Kawasaki (JP); Shinji Hirata, Machida (JP); Hideitsu Hino, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 1026 days.

(21) Appl. No.: 11/862,240

(22) Filed: Sep. 27, 2007

(65) Prior Publication Data

US 2008/0178008 A1    Jul. 24, 2008

(30) Foreign Application Priority Data

Oct. 4, 2006   (JP) ................. 2006-272750

(51) Int. Cl.
   *H04L 29/06*    (2006.01)
(52) U.S. Cl.
   USPC ........... 713/186; 713/176; 713/182; 713/185; 726/26; 726/27; 726/28; 709/225
(58) Field of Classification Search ................. 713/176, 713/182, 185, 186; 726/26, 27, 28; 709/225
   See application file for complete search history.

(56) References Cited

U.S. PATENT DOCUMENTS

| | | | | |
|---|---|---|---|---|
| 6,076,162 A * | 6/2000 | Deindl et al. | ................. | 713/159 |
| 6,836,554 B1 | 12/2004 | Bolle et al. | | |
| 7,200,753 B1 * | 4/2007 | Shinzaki et al. | ............. | 713/182 |
| 2001/0036301 A1 * | 11/2001 | Yamaguchi et al. | .......... | 382/125 |
| 2002/0104006 A1 * | 8/2002 | Boate et al. | .................... | 713/186 |
| 2004/0111625 A1 * | 6/2004 | Duffy et al. | .................... | 713/186 |
| 2004/0255168 A1 * | 12/2004 | Murashita et al. | ............ | 713/202 |
| 2005/0135661 A1 * | 6/2005 | Mimura et al. | ............... | 382/124 |
| 2005/0234828 A1 * | 10/2005 | Matsuyama et al. | ............ | 705/51 |
| 2006/0147094 A1 * | 7/2006 | Yoo | ................ | 382/117 |
| 2007/0047783 A1 * | 3/2007 | Kim et al. | ..................... | 382/124 |

(Continued)

FOREIGN PATENT DOCUMENTS

| | | |
|---|---|---|
| JP | 2005-268840 | 9/2005 |
| WO | WO 2004/104899 | 12/2004 |
| WO | WO 2005064547 A1 * | 7/2005 |
| WO | WO 2007069146 A2 * | 6/2007 |

OTHER PUBLICATIONS

Pim Tuyls et al., "Practical Biometric Authentication with Template Protection", vol. 3546, 2005, pp. 436-446.

(Continued)

*Primary Examiner* — Nathan Flynn
*Assistant Examiner* — Sarah Su
(74) *Attorney, Agent, or Firm* — Antonelli, Terry, Stout & Kraus, LLP.

(57) ABSTRACT

The present invention captures user's biometric data during enrollment and converts it by a given conversion parameter to create a template. It creates verification information for the conversion parameter, and enrolls it in an authentication server together with the template. The conversion parameter is stored in an IC card or the like for issuance to the user. During authentication, the authentication server verifies that the authentication terminal knows the conversion parameter, using conversion parameter verification information. Next, the authentication terminal converts user's biometric data newly captured by a conversion parameter to create matching information, and transmits it to the authentication server. The authentication server matches the matching information with the template to determine whether the user is a principal.

20 Claims, 4 Drawing Sheets

U.S. PATENT DOCUMENTS

| | | | |
|---|---|---|---|
| 2007/0118758 A1* | 5/2007 | Takahashi et al. | 713/186 |
| 2007/0180263 A1* | 8/2007 | Delgrosso et al. | 713/186 |
| 2007/0226516 A1* | 9/2007 | Kubota et al. | 713/186 |
| 2008/0016005 A1* | 1/2008 | Owen et al. | 705/73 |
| 2008/0222496 A1* | 9/2008 | Tuyls et al. | 714/777 |
| 2009/0070860 A1* | 3/2009 | Hirata et al. | 726/5 |
| 2010/0328034 A1* | 12/2010 | Medina et al. | 340/5.83 |

OTHER PUBLICATIONS

Hirata, et al., "A Proposal of Cancelable Biometrics for Image Matching Based Biometrics", contributed on Jul. 14, 2006 to pp. 205 to 210, vol. 106, Issue No. 176, IEICE (The Institute of Electronics, Information and Communication Engineers Japan) Technical Report.

* cited by examiner

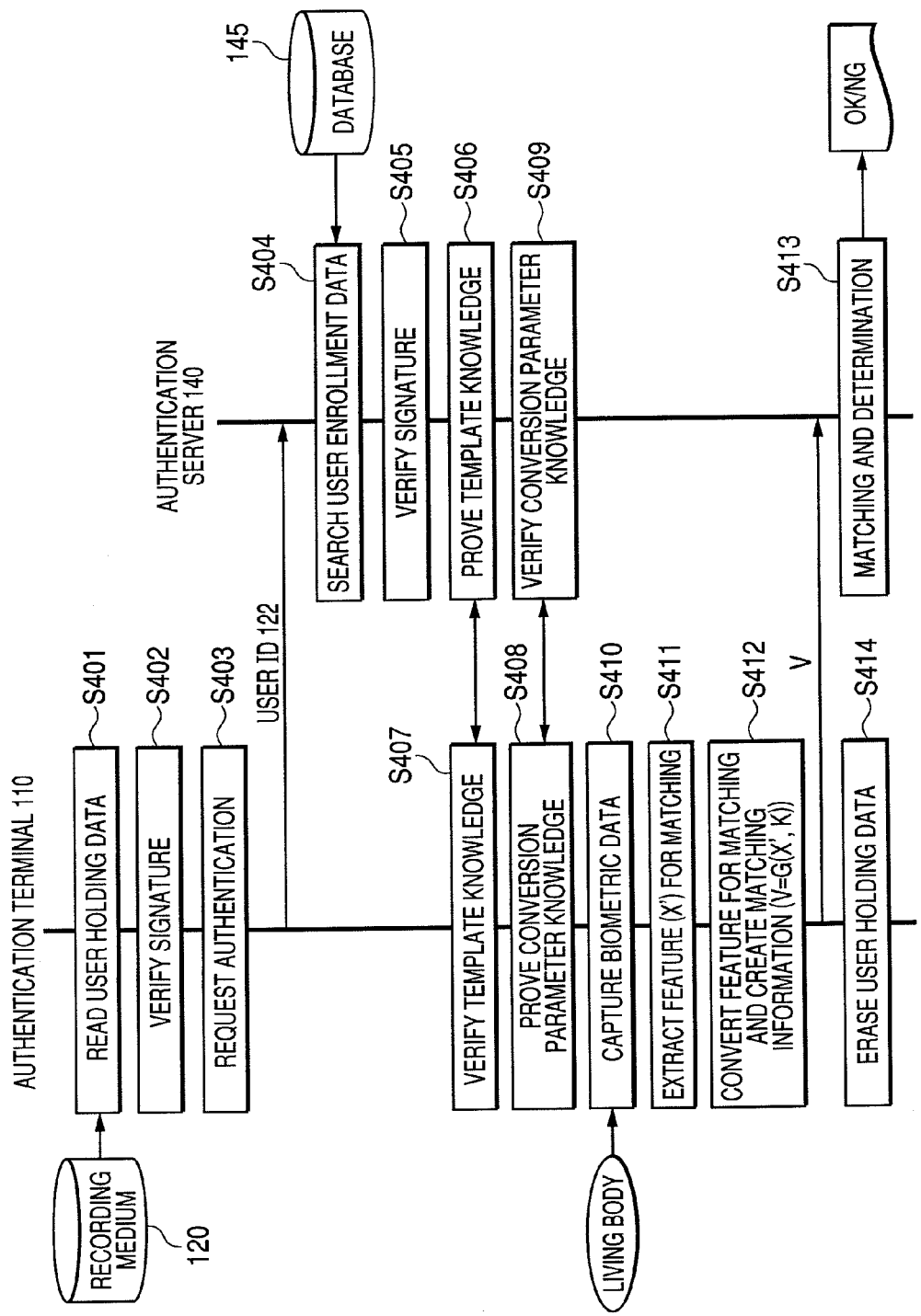

BIOMETRIC AUTHENTICATION SYSTEM, ENROLLMENT TERMINAL, AUTHENTICATION TERMINAL AND AUTHENTICATION SERVER

CLAIM OF PRIORITY

The present application claims priority from Japanese application serial No. 2006-272750 filed on Oct. 4, 2006, the contents of which is hereby incorporated by reference into this application.

BACKGROUND OF THE INVENTION (1) Field of the Invention

The present invention relates to biometric authentication technology that authenticates individuals by using their biometric features.

(2) Description of the Related Art

A user authentication system that uses biometric data captures biometric data from a user during enrollment, and extracts and enrolls information called features. The enrollment information is referred to as a template. During authentication, the system captures biometric data from the user again to extract features, and matches it with the template to determine whether the user is a principal. When an authentication server authenticates the user at a client side based on biometric data via a network, it generally holds the template. The client captures user's biometric data during authentication to extract features, and transmits them to the authentication server. The authentication server matches the features with the template to determine whether the user is a principal.

Advantageously, biometric authentication is difficult to forge and never fails to be forgotten. However, disadvantageously, since it is said that biometric data such as fingerprints and irises is unchanged for life, and the number of pieces of biometric data of one user is limited (for example, the number of fingerprints is only 10), if templates enrolled in the authentication server leak and a fear of personating occurs, enrollment information cannot be easily discarded or updated, so that safety cannot be restored.

For this problem, U.S. Pat. No. 6,836,554 discloses biometric data concealment-type authentication that converts features by a certain type of a conversion function, and performs enrollment and matching in a concealed state. In the biometric data concealment-type biometric authentication system, since an authentication server performs authentication without knowing features, even if templates and matching information leak from the authentication server, the original features and biometric data are not revealed, contributing to preventing a threat of being used to create forged living body.

The biometric data concealment-type authentication system cannot prevent a threat of personating when templates enrolled in a server and matching information used when legal users are authenticated leak. Since the templates are information that is managed within the server and is not transmitted to the outside, a leak risk can be reduced by operation. However, since the matching information used when legal users are authenticated is information transmitted from a client to a server, a leak risk is high.

SUMMARY OF THE INVENTION

An object of the present invention is to provide a biometric authentication system that allows a server to confirm that the features of legal users exist in clients, in a state in which the features are concealed from the server.

Another object of the present invention is to provide an operationally inexpensive biometric authentication system that reduces a threat that clients transmit matching information to an illegal server.

To achieve the objects, the present invention is a biometric authentication system that includes an authentication terminal that captures biometric data, and an authentication server that authenticates a user based on biometric data captured by an authentication terminal. The authentication terminal includes: a conversion unit that converts the biometric data based on a conversion parameter; a transmitting unit that transmits converted biometric data converted by a conversion unit to the authentication server; and a conversion parameter proof unit that proves knowledge about the conversion parameter without disclosing it to the authentication server. The authentication server includes: a receiving unit that receives the converted biometric data from the authentication terminal; a conversion parameter verification unit that verifies that the authentication terminal knows the conversion parameter, based on communication with the authentication terminal and conversion parameter verification information; and a matching unit that compares the converted biometric data with enrollment data to check similarities. When the verification of the converted parameter by the conversion parameter verification unit succeeds, and the checking of similarities between the converted biometric data and the enrollment data by the matching unit succeeds, the authentication server determines that the authentication has succeeded.

In the present invention, an enrollment terminal in the biometric authentication system that authenticates users based on biometric data includes: a generation unit that generates a conversion parameter; a verification information creation unit that creates conversion parameter verification information; an enrollment biometric data conversion unit that converts biometric data captured during enrollment based on the conversion parameter to create enrollment data; a signature creation unit that creates first signature data for assuring the integrity of pair data of the enrollment data and the conversion parameter verification information; and a transmission unit that transmits the pair data of the enrollment data and the conversion parameter verification information and the first signature data to the authentication server.

Furthermore, in the present invention, the authentication terminal in the biometric authentication system including an authentication server that authenticates a user based on biometric data includes: a capture unit that captures biometric data; a conversion unit that converts the captured biometric data based on the conversion parameter; a transmission unit that transmits converted biometric data converted by the conversion unit to the authentication server; and a conversion parameter proof unit that proves knowledge about the conversion parameter without disclosing it to the authentication server.

Furthermore, in the present invention, the authentication server in the biometric authentication system that authenticates users based on biometric data captured by the authentication terminal includes: a receiving unit that receives converted biometric data converted by the conversion parameter in the authentication terminal; a conversion parameter verification unit that verifies that the authentication terminal knows the conversion parameter, based on communication with the authentication terminal and the conversion parameter verification information; and a matching unit that compares the converted biometric data with the stored enrollment data to check similarities. When the verification of the converted parameter by the conversion parameter verification unit succeeds, and the checking of similarities between the converted biometric data and the enrollment data by the matching unit succeeds, the authentication server determines that the authentication has succeeded.

In this specification and the like, various "functions" in the enrollment terminal, the authentication terminal, the authentication server, and the like may be referred to as "units". For example, it is to be noted that "conversion parameter verification function" may be referred to as "conversion parameter verification unit", and "matching function" as "matching unit". Since "biometric data" itself can be used as features in the biometric authentication system, it is to be noted that "biometric data" also includes the meaning of "feature".

According to the present invention, after the authentication server confirms in the conversion parameter verification unit that the authentication terminal knows a correct conversion parameter K, in the matching unit, it checks similarities between the template $T(=F(X,K))$ being enrollment data, and matching information $V(=G(Y, K))$ being the converted biometric data. Since the authentication must know the conversion parameter K before transmitting the matching information V, it must know biometric data Y.

Therefore, by confirming a relation $d(T,V)=d(X,Y)<t$, the authentication server can confirm that the biometric data Y as a feature (probably the feature of a legal user) sufficiently close to the biometric data X as a feature during enrollment exists in the authentication terminal (without knowing X and Y), As a result, a possible leak of the template T and matching information $U(=F(X',K),d(X',X)<t)$ used when a legal user is authenticated will not directly lead to a threat of personating.

BRIEF DESCRIPTION OF THE DRAWINGS

These and other features, objects and advantages of the present invention will become more apparent from the following description when taken in conjunction with the accompanying drawings wherein:

FIG. 4 is a flowchart showing authentication processing of a first embodiment.

DETAILED DESCRIPTION OF THE PREFERRED EMBODIMENTS

[First Embodiment]

A first embodiment of the present invention describes a biometric authentication system that authenticates biometric data indicative of a user's feature while concealing it from an authentication server.

Figure 1:
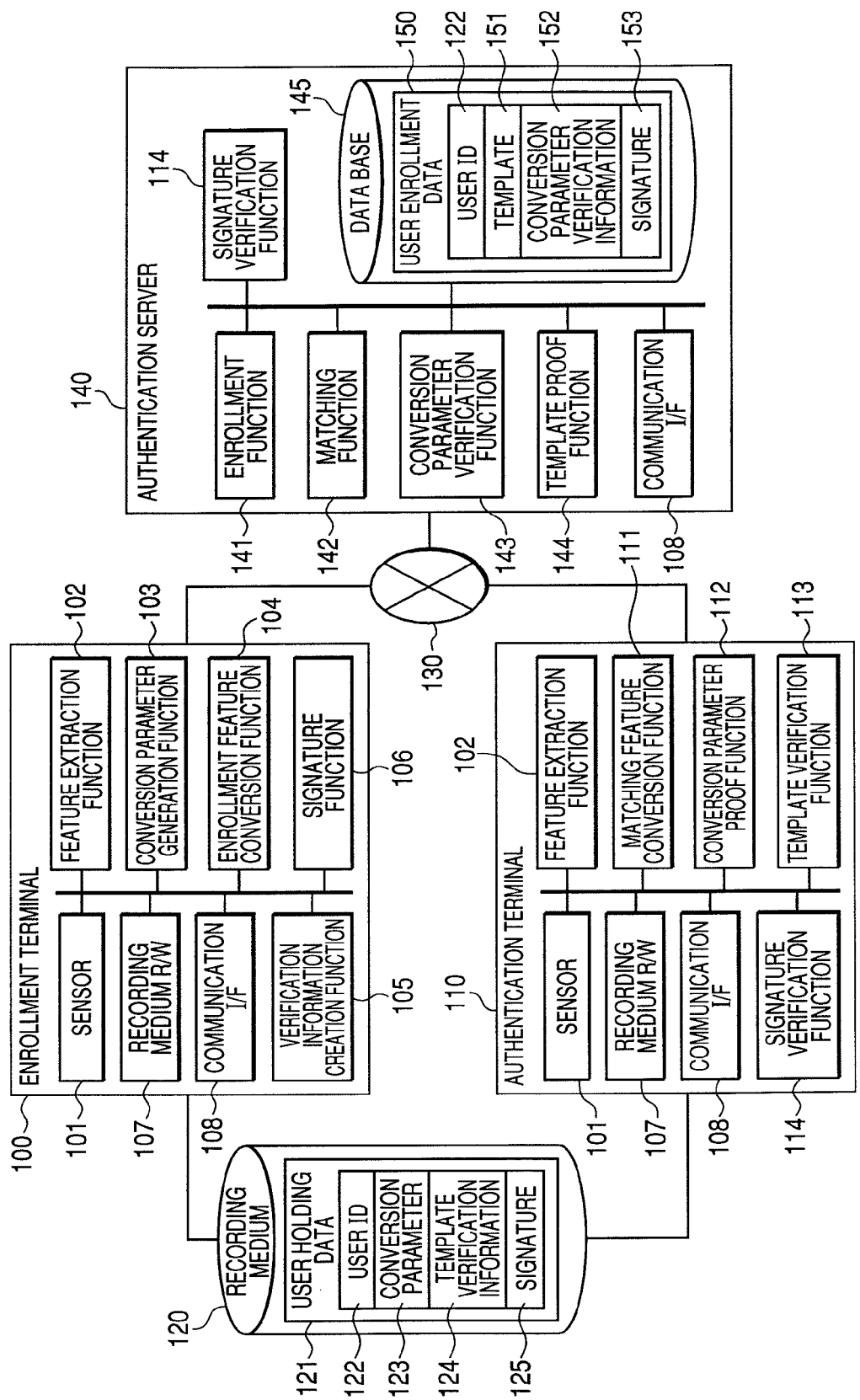
FIG. 1 is a block diagram showing a functional configuration of a first embodiment of the present invention.

FIG. 1 shows an overall configuration of a biometric authentication system of this embodiment. The biometric authentication system of this embodiment includes: an enrollment terminal 100 that captures user's biometric data during enrollment and issues user retention data and user enrollment data; an authentication terminal 110 that captures user's biometric data during authentication; an authentication terminal 110 that uses user holding data for conversion into conversion biometric data and transmits it to the authentication serve; a recording medium 120 that records user holding data; a network 130; and an authentication server 140 that performs matching processing for biometric data as features to perform user authentication.

The authentication terminal 110 may be mounted as one device, or may include a sensor and an IC card reader writer R/W that are connected to a personal computer (PC). The authentication terminal 110 also may include a user's cellular phone, a personal digital assistant (PDA), a bank's automated teller machine (ATM), a credit card settlement terminal, and a kiosk terminal. Although this embodiment assumes that the enrollment terminal 100 and the authentication terminal 110 are terminals different from each other, they may be formed as one terminal having functions of both.

As the recording medium 120, an IC card, magnetic card, flash memory, hard disk, two-dimensional bar code, and the like may be used. The recording medium 120 may be an internal storage unit of the authentication terminal 110.

As the network 130, a network such as a wide area network (WAN) and a local area network (LAN), communication between devices that use a universal serial bus (USB) and IEEE1394, or radio communications such as a cellular phone network and BlueTooth (enrolled trademark) may be used. For example, in the case of an Internet banking system, the authentication terminal 110 may be a user's home PC or cellular phone, the authentication server 140 may be a banking server, and the network 130 may be the Internet. In the case of a PC login system, the authentication terminal 110 may be an authentication device, the authentication server 140 may be PC, and the network 130 may be a USB cable.

The enrollment terminal 100 includes: a sensor 101 such as a fingerprint sensor that captures biometric data; a feature extraction function 102 that extract a feature from captured biometric data; a conversion parameter generation function 103; an enrollment feature conversion function 104 that converts a feature for enrollment by conversion parameters to conceal it and creates a template; a verification information creation function 105 that creates verification information for conversion parameters and templates; a signature function 106 that creates signatures to guarantee the integrity (not tampered) of created information; a recording medium reader/writer R/W 107 that reads and writes data of the recording medium 120; and a communication interface (I/F) 108 that functions as a transmitting/receiving unit for communicating information such as enrollment data to the authentication server 140 via the network 130.

When the enrollment terminal 100 is configured with a general-purpose PC and the like, as described later, the feature extraction function 102, the conversion parameter generation function 103, the enrollment feature conversion function 104, the verification information creation function 105, and the signature function 106 are configured with programs and the like processed by its internal central processing unit (CPU). In this case, these "functions" constitute parts of programs executed in the enrollment terminal 100. Though the programs are usually stored in its internal storage unit (memory), it goes without saying that they can be offered using a recording medium or via a communication medium such as the network 130 as required. The same is also true for other programs used below in this embodiment.

The authentication terminal 110, like the enrollment terminal 100, includes: the sensor 101 that captures biometric data; the feature extraction function 102 that extracts a feature from biometric data; the recording medium reader/writer R/W 107 that reads and writes data of the recording medium 120; and a communication I/F 108 that transmits and receives data via the network 130. Furthermore, the authentication terminal 110 includes: a matching feature conversion function 111 that converts a feature for matching using conversion parameters to conceal it, and creates matching information; a conversion parameter proof function 112 that proves to the authentication server 140 that the authentication terminal 110 knows a correct conversion parameter; a template verification function 113 that verifies that the authentication server 140 knows a correct template; and a signature verification function 114 that verifies a signature issued by the enrollment terminal 100.

When the authentication terminal 110 is configured with a general PC like the enrollment terminal 100, the feature extraction function 102, the matching feature conversion function 111, the conversion parameter proof function 112, the template verification function 113, and the signature verification function 114 may be implemented by program processing in its internal CPU.

The recording medium 120 stores user holding data 121. The user holding data 121 includes user identifiers (ID) 122, conversion parameters 123, template verification information 124, and signatures 125.

The authentication server 140 includes: the communication I/F 108 that receives a converted living body feature and the like; the signature verification function 114; an enrollment function 141 that enrolls user enrollment data created by the enrollment terminal 100 in a database 145; a matching function 142 that matches a feature being received conversion biometric data; a conversion parameter verification function 143 that verifies that the authentication terminal 110 knows a correct conversion parameter; a template proof function 144 that proves to the authentication terminal 110 that the authentication server 140 knows a correct template; and a database 145. The database 145 records enrollment data 150 of one or more users. The user enrollment data 150 includes user IDs 122, templates 151, conversion parameter verification information 152, and signatures 153.

The signature verification function 114, the enrollment function 141, the matching function 142, the conversion parameter verification function 143, and the template proof function 144 except the communication I/F 108 and the database 145 of the authentication server 140 can be achieved by program processing in a CPU in a hardware configuration described below.

Figure 2:
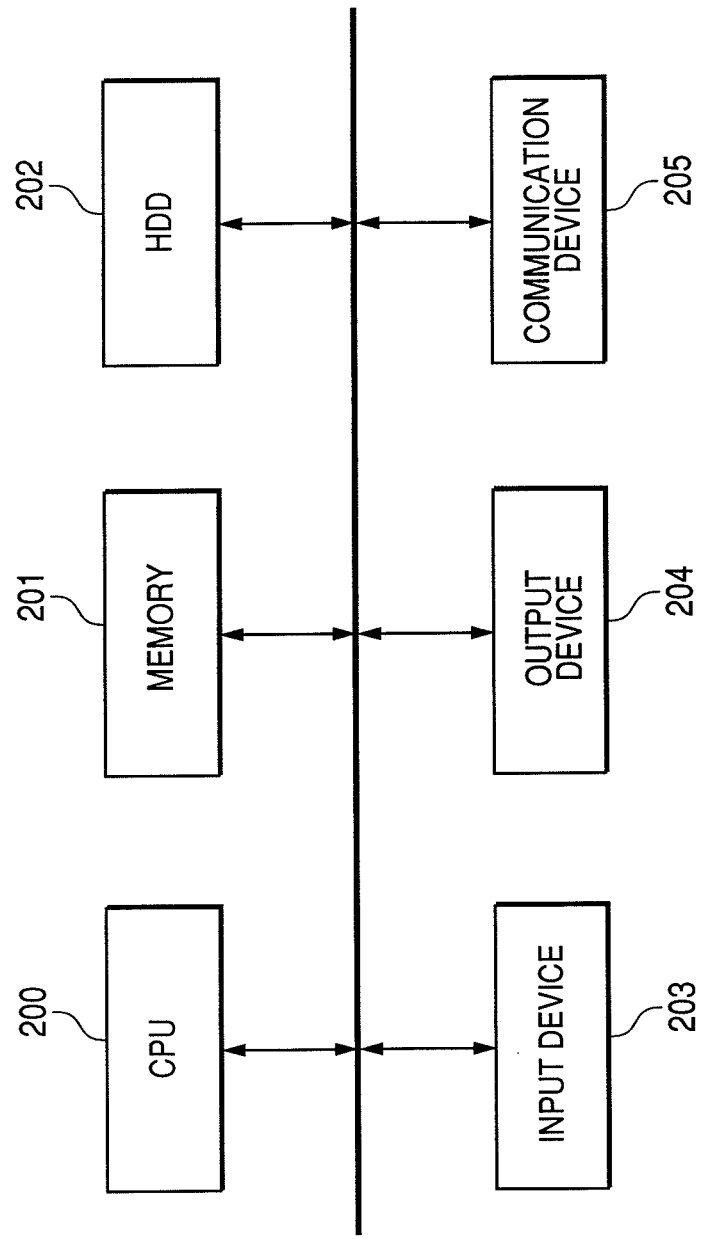
FIG. 2 is a block diagram showing a hardware configuration of a first embodiment.

FIG. 2 shows an example of hardware configuration of the enrollment terminal 100, the authentication terminal 110, and the authentication server 140 in the first embodiment. These terminals, as shown in FIG. 2, include a CPU 200, memory 201, a hard disk drive (HDD) 202, an input device 203, an output device 204, and a communication device 205 (communication I/F) 205 that are connected via an internal bus. The CPU 200 executes programs stored in the memory 201 and performs other processings. As is apparent from the above, the terminals and the server both a general-purpose computer system having these elements.

Figure 3:
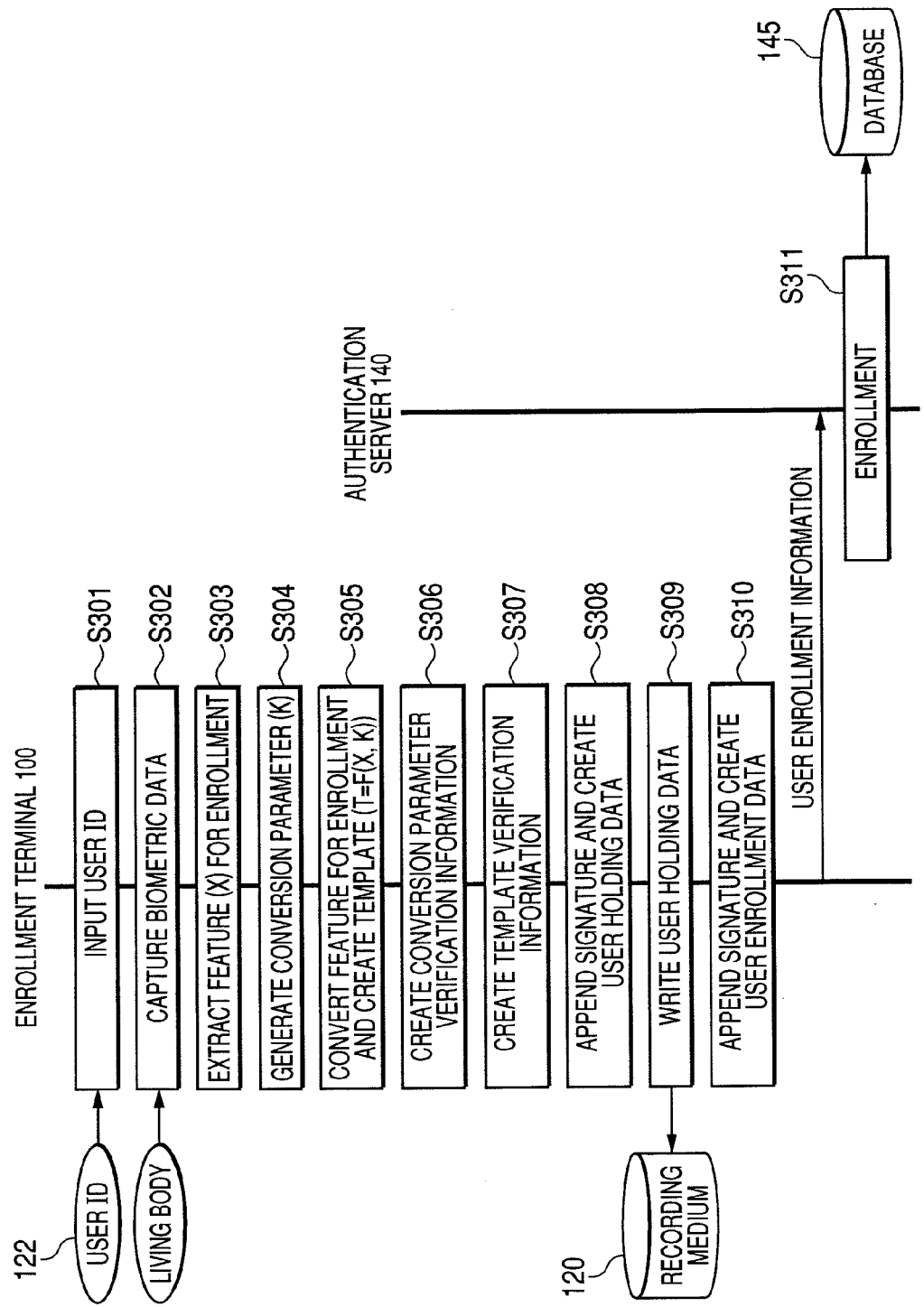
FIG. 3 is a flowchart showing enrollment processing of a first embodiment.

FIG. 3 shows an enrollment-time processing procedure and data flow in this embodiment. Hereinafter, enrollment processing in the first embodiment will be described according to an enrollment flow shown in FIG. 3.

The enrollment terminal 100 accepts the input of user ID 122 (Step S301). The user ID 122 may be inputted by the user and the operator, or a user ID generated by the authentication server 140 may be transmitted to the enrollment terminal 100. The enrollment terminal 100 captures user's biometric data by using the sensor 101 or the like (Step S302). The biometric data is digitalized data of information about human living body such as fingerprint image, vein image, iris image, and voice data.

The enrollment terminal 100 extracts a feature for enrollment (X) from the captured biometric data by the feature extraction function 102 (Step S303). Various methods of extracting the feature for enrollment (X) are put to practical use, depending on the type and matching system of biometric data, and any types of features may be used. The biometric data itself captured in Step S302 may be used as a feature.

The enrollment terminal 100 generates a conversion parameter (K) 123 by the conversion parameter generation function 103 (Step S304). The enrollment terminal 100, by the enrollment feature conversion function 104, uses the conversion function (F) and the conversion parameter (K) 123 to convert a feature for enrollment (X) and create a template (T=F(X,K)) 151 (Step S305). Concrete examples of feature (X), conversion parameter (K), and conversion function (F) are detailed later.

Next, the enrollment terminal 100 creates verification information 152 for a conversion parameter (K) 123 by the verification information creation function 105 (Step S306). The enrollment terminal 100 creates verification information 124 for a template (T) 151 by the verification information creation function 105 (Step S307). The verification information 152 and 124 will be detailed later.

The enrollment terminal 100 creates an electronic signature 125 by the signature function 106 for a user ID 122, a conversion parameter (K) 123, and template verification information 124, and puts together these data to create user holding data 121 (Step S308). The enrollment terminal 100 writes the user holding data 121 to the recording medium 120 (Step S309).

Likewise, the enrollment terminal 100 creates an electronic signature 153 by the signature function 106 for user ID 122, template (T) 151, and conversion parameter verification information 152, and puts together these data to create user enrollment data 150 and transmit it to the authentication sever 140 via the communication I/F 108 (Step S310). The authentication server 140 receives the user enrollment data 150 via the communication I/F 108, and enrolls it in the database 145 (Step S311).

Hereinbefore, an enrollment-time processing procedure in the biometric authentication system of this embodiment has been described. The following describes an authentication-time processing procedure of the biometric authentication system of this embodiment.

FIG. 4 shows a processing procedure and a data flow during authentication in this embodiment. The authentication terminal 110 reads user holding data 121 from the recording medium 120 by using the recording medium R/W 107, and stores it in an internal temporary storage (memory 201 of FIG. 2, and the like) (Step S401). The authentication terminal 110 verifies a signature 125 by the signature verification function 114 to determine whether the user holding data 121 is tampered. If it has been tampered, the authentication terminal 110 halts the authentication processing (Step S402). Next, it transmits a user ID 122 to the authentication server 140 to perform an authentication request (Step S403).

On receiving an authentication request from the authentication terminal 110, the authentication server 140 uses the user ID 122 as a key to search the database 145 for user enrollment data 150 (Step S404). The authentication server 140 verifies the signature 153 by the signature verification function 114 to determine that the user enrollment data 150 is not tampered. If it has been tampered, the authentication server 140 discontinues the authentication processing (Step S405).

The authentication server 140 uses the template proof function 144 to prove to the authentication terminal 110 that it knows a correct template without affording knowledge about the template 151 (Step S406). A concrete method of template knowledge proof of the template proof function 144 will be described later.

On the other hand, the authentication terminal 110 verifies using template verification information 124 by the template verification function 113 that the authentication server 140 knows a correct template 151. If the verification fails, the authentication terminal 110 discontinues authentication processing (Step S407). A concrete method of the verification will be described later.

Likewise, the authentication terminal 110 proves to the authentication server 140 by the conversion parameter proof function 112 that the authentication terminal 110 knows a correct conversion parameter 123, without affording knowledge about the conversion parameter 123 (Step S408). A concrete method of conversion parameter knowledge proof in the conversion parameter proof function 112 will be described later.

On the other hand, the authentication server 140 verifies using conversion parameter verification information 152 by the conversion parameter verification function 143 that the authentication terminal 110 knows a correct conversion parameter 123. If the verification fails, the authentication server 140 discontinues the authentication processing (Step S409). A concrete method of the verification will be described later.

The authentication terminal 110 captures user's biometric data by the sensor 101 and the like (Step S410). The authentication terminal 110 extracts matching feature (X') from the captured biometric data by the feature extraction function 102 (Step S411). The authentication terminal 110 uses the conversion function (G) and the conversion parameter (K) 123 by the matching feature conversion function 111 to convert a matching feature (X') into matching information (V=G(X', K)) and transmit it to the authentication server 140 (Step S412). A concrete example of the conversion function (G) will be described later.

The authentication server 140 receives the matching information (V) via the communication I/F 108 to match with the template (T) 151 by the matching function 142. If T and V match as a result of the matching, it determines that the user is a principal (OK), and otherwise determines that the user is a stranger (NG) (Step S413). In this case, the matching uses a certain distance function d and a determination threshold value t to determine as match when d(T, V)<t, and as mismatch in other cases. A concrete example of the distance function d will be described later. The authentication terminal 110 erases the read user holding data 121 from the temporary storage unit (memory 201, etc.) and the like (Step S414).

The following describes a concrete example of features and the conversion function described in the above-described embodiments. As an example applicable to iris authentication, a method described in Michael Braithwaite, et al., "Application-Specific Biometric Templates", retrieved on Sep. 4, 2006.

As feature X, assume 2048-bit data called iris code extracted from an iris image. A distance d(X, Y) between iris codes X and Y is afforded by a hamming distance. A hamming distance is defined as the number of different bits in corresponding positions of X and Y.

A conversion parameter K for iris code is afforded as proper data of 2048 bits, and a conversion function is defined as F(X, K)=G(Y, K)=X xor K. A xor B represents exclusive OR of A and B. For arbitrary X, Y, and K, d(X, Y)=d(F(X, K),G(Y, K)) is satisfied.

Therefore, when a template is represented by T=F(X, K) and matching information is represented as V=G(X', K), a distance d (T, V) between T and V becomes equal to a distance d (X, X') between X and X'. Thereby, the authentication server 140 can obtain a correct matching result without needing to know the original features (iris code) X and X'.

As features and conversion functions, the following methods are known: a method described in the above-described document applicable to fingerprint authentication by Michael Braithwaite, et al., a method described in "Proposal of Cancelable Biometrics Applicable to Biometric Authentication Based on Image Matching" by Shinji Hirata et al. that is applicable to the entire spectrum of biometric authentication technology based on image matching, and a method described in 2006-07-lSEC-SITE-IPSJ-CSEC reported in The Institute of Electronics, Information and Communication Engineers. This embodiment is applicable to all these methods, and all general biometric data concealment-type biometric authentication technologies. As another concrete implementation method of biometric data concealment-type biometric authentication, for example, a method described in Japanese Patent Application Laid-Open Publication No. 2006-158851, "Feature Conversion Method of Biometric data and Living body Recognition System" is known.

The following describes concrete methods of knowledge proof and knowledge verification of the conversion parameter (K) and the template (T) used in the conversion parameter proof function 112, the template verification function 113, the conversion parameter verification function 143, and the template proof function 144 in the above-described embodiment. These methods can be implemented in various ways using zero knowledge proof, public key cipher technology, and the like. In this embodiment, a concrete method using ElGamal signature is described, and a concrete example using a hash function is described as a second embodiment.

In key generation in ElGamal signature, for a large prime number p, a generating element g of a larger order q in a cyclic subgroup of a multiplicative group on Zp, a random number x, and y=g^x mod p, P=(p, g, y) is defined as public key and x as secret key (for details, refer to ElGamal, Taher, "A public key cryptosystems and a signature scheme based on discrete logarithm, " Proc of CRYPTO'84, LNCS 197, pp, 10-18, Springer-Verlag, 1985).

The enrollment terminal 100, during enrollment, creates the above-described p and g by the verification in formation creation function 105, with secret key as x, uses the above-described conversion parameter (K) 123 to create public key PK=(p, g, g^K mod p), and sends it as conversion parameter verification information 152 to the authentication server 140. Likewise, the verification information creation function 105, with secret key as x, uses the template (T) 151 to create public key PT=(p, g, g^T mod p), and stores it in the recording medium 120 as template verification information 124.

As secret key x, its hash key may be used in place of the conversion parameter (K) 123 and the template (T) 151. Alternatively, sets of secret keys and public keys may be previously created before using a hash value of secret key as the conversion parameter (K) 123.

When the authentication terminal 110 proves to the authentication server 140 by the conversion parameter proof function 112 in the conversion parameter knowledge proof step S408 of FIG. 4 that it knows the conversion parameter (K) 123, the authentication server 140 creates random data m and transmits it to the authentication terminal 110. For m, the authentication terminal 110 creates a signature by using the conversion parameter 123 as secret key, and returns it to the authentication server 140. The authentication server 140 verifies the signature using conversion parameter verification information 152 (public key PK) by the conversion parameter verification function 143.

Likewise, when the authentication 140 proves to the authentication terminal 110 in the template knowledge proof step 406 of FIG. 4 that it knows the template (T) 151, it creates a signature with the template 151 as secret key by the template proof function 144. The authentication terminal 110 verifies it using the template verification information 124 (public key PT) by the template verification function 113. For details of signature creation and a signature verification algorithm, refer to the above-described ElGamal reference document.

In the biometric authentication system of this embodiment, after the authentication server 140 confirms by the conversion parameter verification function that the authentication terminal 110 knows a correct conversion parameter (K), it matches matching information V=G (X', K) and the template T=F (X, K). Thereby, the authentication server 140 can confirm that X' satisfying a relation d(X, X')<t exists in the authentication terminal 110, that is, biometric data of a legal user has been inputted.

In traditional concealment-type biometric authentication systems, since an authentication server only matches matching information V and template T to determine whether a target person is a principal or not, it cannot determine whether biometric data of a legal user exists in an authentication terminal, or the authentication terminal simply knows only matching information. Therefore, there has been a problem in that attackers who have captured template T, and attackers who have captured matching information U used when legal users performed authentication can personate legal users without capturing biometric data by transmitting it as matching information to an authentication server.

On the other hand, this embodiment realizes a highly secure biometric data concealment-type biometric authentication system by preventing such personating attacks. In this embodiment, although a leak of template and matching information does not directly lead to threat of personating, if the conversion parameter (K) 123 also leaks at the same time, the original feature can be restored. Likewise, although a leak of the conversion parameter (K) 123 does not directly lead to threat of personating, if the template or the matching information leaks at the same time, the original feature can be restored. This problem can be solved by periodically updating the conversion parameter and the template.

Furthermore, in a biometric authentication system of this embodiment, after the authentication terminal 110 confirms by the template verification function 113 that the authentication server 140 knows a correct template, it transmits matching information V. This prevents an attacker from personating an authentication server to communicate with the authentication terminal 110 to capture the matching information V of legal users. If the template 151 leaks and an attacker who has captured it personates an authentication server, the authentication terminal 110 will transmit the matching information V to the attacker. In this case, however, since the attacker has already captured the template, the transmission of the matching information V will not cause further threat.

[Second Embodiment]

The above-described first embodiment has described an example of implementing methods of knowledge proof and knowledge verification of conversion parameter (K) and template (T) by using the public key cipher technology and the like.

The following describes an example using a hash function as a second embodiment. A hash function affording a hash value of data x is represented as H (x). Examples of the hash function include SHA256 and the like. (For details, refer to FIPS 180-2, "Secure Hash Standard (SHS)", retrieved on Sep. 4, 2006.

In this embodiment, the enrollment terminal 100 calculates a hash value VK=H(K) of the conversion parameter 123(K), and uses it as the conversion parameter verification information 152. It also calculates a hash value VT=H(T) of the template 151(T), and uses it as template verification information 124.

When the authentication terminal 110 proves to the authentication server 140 by the conversion parameter proof function 112 that it knows the conversion parameter 123, like the previous embodiment, the authentication server 140 creates random data m and transmits it to the authentication terminal 110. The authentication terminal 110 uses m and K to calculate m'=H(H(K)|m) and returns it to the authentication server 140. "x|y" denotes bit connection of x and y. The authentication server 140 uses the conversion parameter verification information 152(VK) and m to calculate H(VK|m) and determines whether it matches with m'.

Likewise, when the authentication server 140 proves to the authentication terminal 110 by the template proof function 144 that it knows the template 151, the authentication terminal 110 creates random data m and transmits it to the authentication server 140. the authentication server 140 uses m and T to calculate m'=H(H(T)|m) and returns it to the authentication terminal 110. The authentication terminal 110 uses the template verification information 124(VT) and m to calculate H(VT|m) and determines whether it matches with m'.

Hereinbefore, as the first and the second embodiments, as methods of knowledge proof and knowledge verification of the conversion parameter (K) and the template (T), examples using ElGamal signature and a hash function have been described. However, it goes without saying that the present invention is not limited to these embodiments. For example, Schrorr signature (Schnorr signature, retrieved on Sep. 4, 2006), and Cramer-Shoup signature (Cramer-Shoup cryptosystem, retrieved on Sep. 4, 2006) may also be used.

Hereinbefore, concrete embodiments of the present invention have been described. However, the present invention is not limited to the above detailed embodiments, and is applicable to any applications that perform user authentication based on biometric data. For example, the present invention is applicable to information access control in an in-company network, principal confirmation in Internet banking systems and ATM, login to membership-oriented Web sites, personal authentication during entrance to protective areas, and login of personal computers.

What is claimed is:

1. A biometric authentication system comprising:
   an enrollment terminal that enrolls enrollment data (T);
   an authentication terminal that captures verification biometric data (X'); and
   an authentication server that authenticates a user, the authentication server being provided separately from the authentication terminal,
   wherein the enrollment terminal includes:
      a generation unit that generates a conversion parameter (K);
      an enrollment biometric data conversion unit that converts enrollment biometric data (X) of a user captured during enrollment based on the conversion parameter (K) to create the enrollment data (T=F(X,K)),
      a verification information creation unit that creates a public key (PK) of a secret key, the secret key corresponding to the conversion parameter (K), and a transmission unit that transmits the enrollment data (T) and the public key (PK) to the authentication server, without disclosing the conversion parameter (K) to the authentication server, wherein the authentication terminal includes:

a conversion unit that converts the verification biometric data (X') of the user based on the conversion parameter (K) to create converted biometric data (V=G(X', K));

a transmission unit that transmits the converted biometric data (V) to the authentication server, without disclosing the conversion parameter (K) to the authentication server; and a conversion parameter proof unit that creates a signature using the secret key to prove knowledge about the conversion parameter (K), wherein the authentication server includes:

a receiving unit that receives the enrollment data (T) from the enrollment terminal and the converted biometric data (V) from the authentication terminal;

a conversion parameter verification unit that verifies that the authentication terminal knows the conversion parameter based on the signature received from the authentication terminal; and a matching unit that compares the converted biometric data (V) with enrollment data (T) to check similarities between the enrollment biometric data (X) and the verification biometric data (X'), and wherein when the conversion parameter verification unit of the authentication server verifies that the authentication terminal knows the conversion parameter (K), the authentication server creates random data (m) and transmits the random data (m) to the authentication terminal, the conversion parameter proof unit of the authentication terminal creates the signature for the random data (m) by using the secret key and returns the signature to the authentication server, and the conversion parameter verification unit of the authentication server verifies the signature for the random data (m) by using the public key (PK), and when the conversion parameter verification unit succeeds to verify the signature for the random data (m), the authentication server checks the similarities between the enrollment biometric data (X) and the verification biometric data (X') by the matching unit.

2. The biometric authentication system according to claim 1, wherein the authentication server further includes an enrollment data proof unit that proves knowledge about the enrollment data, wherein the authentication terminal further includes an enrollment data verification unit that verifies that the authentication server knows the enrollment data, based on communication with the authentication server, wherein the enrollment data proof unit of the authentication server creates another signature using another secret key corresponding to the enrollment data (T), and the enrollment data verification unit of the authentication terminal verifies the another signature by using another public key (PT) of the another secret key, and wherein when the enrollment data verification unit succeeds to verify the another signature, the authentication terminal transmits the converted biometric data (V) from the transmission unit to the authentication server.

3. The biometric authentication system according to claim 2, wherein the enrollment data (T) is used as the another secret key.

4. The biometric authentication system according to claim 2, wherein the another secret key is created based on the enrollment data (T).

5. The biometric authentication system according to claim 1, wherein the authentication terminal further includes a storage unit that stores the conversion parameter.

6. The biometric authentication system according to claim 1, wherein the authentication terminal further includes a reading unit that reads the conversion parameter stored in a recording medium by the enrollment terminal, and at termination of authentication processing, erases the conversion parameter from the recording medium.

7. The biometric authentication system according to claim 1, wherein the parameter (K) is used as the secret key.

8. The biometric authentication system according to claim 1, wherein the secret key is created based on the parameter (K).

9. The biometric authentication system according to claim 1, wherein the parameter (K) is created based on the secret key.

10. The biometric authentication system according to claim 1, wherein a distance between the enrollment biometric data (X) and the verification biometric data (X') is equal to a distance between the enrollment data (T) and the converted biometric data (V).

11. A biometric authentication method effected via a biometric authentication system including:

an enrollment terminal that enrolls enrollment data (T);

an authentication terminal that captures verification biometric data (X'); and an authentication server that authenticates a user, the authentication server being provided separately from the authentication terminal, the biometric authentication method comprising:

the enrollment terminal effecting operations including:

generating a conversion parameter (K);

converting enrollment biometric data (X) of a user captured during enrollment based on the conversion parameter (K) to create the enrollment data (T=F(X, K)), creating a public key (PK) of a secret key, the secret key corresponding to the conversion parameter (K), and transmitting the enrollment data (T) and the public key (PK) to the authentication server, without disclosing the conversion parameter (K) to the authentication server, the authentication terminal effecting operations including:

converting the verification biometric data (X') of the user based on the conversion parameter (K) to create converted biometric data (V=G(X',K));

transmitting the converted biometric data (V) to the authentication server, without disclosing the conversion parameter (K) to the authentication server; and creating a signature using the secret key to prove knowledge about the conversion parameter (K), the authentication server effecting operations including:

receiving the enrollment data (T) from the enrollment terminal and the converted biometric data (V) from the authentication terminal;

verifying that the authentication terminal knows the conversion parameter based on the signature received from the authentication terminal; and comparing the converted biometric data (V) with enrollment data (T) to check similarities between the enrollment biometric data (X) and the verification biometric data (X'), and wherein when the authentication server verifies that the authentication terminal knows the conversion parameter (K), the authentication server creates random data (m) and transmits the random data (m) to the authentication terminal, the authentication terminal creates the signature for the random data (m) by using the secret key and returns the signature to the authentication server, and the authentication server verifies the signature for the random data (m) by using the public key (PK), and when the authentication server succeeds to verify the signature for the random data (m), the authentication server checks the similarities between the enrollment biometric data (X) and the verification biometric data (X').

12. The biometric authentication method according to claim 11, wherein the authentication server includes an enrollment data proof unit that proves knowledge about the enrollment data, wherein the authentication terminal includes an enrollment data verification unit that verifies that the authentication server knows the enrollment data, based on communication with the authentication server, wherein the enrollment data proof unit of the authentication server creates another signature using another secret key corresponding to the enrollment data (T), and the enrollment data verification unit of the authentication terminal verifies the another signature by using another public key (PT) of the another secret key, and wherein when the enrollment data verification unit succeeds to verify the another signature, the authentication terminal transmits the converted biometric data (V) to the authentication server.

13. The biometric authentication method according to claim 12, wherein the enrollment data (T) is used as the another secret key.

14. The biometric authentication method according to claim 12, wherein the another secret key is created based on the enrollment data (T).

15. The biometric authentication method according to claim 11, wherein the authentication terminal includes a storage unit that stores the conversion parameter.

16. The biometric authentication method according to claim 11, wherein the authentication terminal includes a reading unit that reads the conversion parameter stored in a recording medium by the enrollment terminal, and at termination of authentication processing, erases the conversion parameter from the recording medium.

17. The biometric authentication method according to claim 11, wherein the parameter (K) is used as the secret key.

18. The biometric authentication method according to claim 11, wherein the secret key is created based on the parameter (K).

19. The biometric authentication method according to claim 11, wherein the parameter (K) is created based on the secret key.

20. The biometric authentication method according to claim 11, wherein a distance between the enrollment biometric data (X) and the verification biometric data (X') is equal to a distance between the enrollment data (T) and the converted biometric data (V).

* * * * *